United States Patent [19]

Kaminski

[11] Patent Number: 4,786,179

[45] Date of Patent: Nov. 22, 1988

[54] EMERGENCY PROTECTION APPARATUS AND METHOD FOR CONCRETE MIXER TRUCKS DISABLED IN THE FIELD

[76] Inventor: Myron Kaminski, 1700 Noble St., Pittsburgh, Pa. 15215

[21] Appl. No.: 896,412

[22] Filed: Aug. 14, 1986

[51] Int. Cl.⁴ .......................... B28C 5/18; B28C 7/12; B01F 1/00; C08L 91/06

[52] U.S. Cl. .......................... 366/2; 106/271; 366/40; 366/54; 366/114

[58] Field of Search .......................... 366/2, 114, 138, 1, 366/44, 54, 56, 167, 173, 136, 64, 40, 168, 137, 172; 106/1.05, 38.25, 1.12, 287.1, 271, 285, 38.27; 285/201, 219, 202, 333, 158

[56] References Cited

U.S. PATENT DOCUMENTS

| | | | |
|---|---|---|---|
| 1,777,646 | 10/1930 | Klein et al. | 366/136 |
| 1,904,061 | 4/1933 | Larson . | |
| 2,282,694 | 5/1942 | Ball | 366/44 X |
| 2,374,733 | 5/1945 | Crawford | 285/201 X |
| 2,437,694 | 3/1948 | Hickman | 366/137 X |
| 2,697,637 | 12/1954 | Mittelstadt | 366/40 X |
| 2,851,330 | 9/1958 | Taylor | 106/38.25 X |
| 3,106,652 | 10/1963 | Burt | 366/114 X |
| 3,124,267 | 3/1964 | Cetrone | 285/202 X |
| 3,248,251 | 4/1966 | Allen | 106/286 |
| 3,447,588 | 6/1969 | Niskorvskikh et al. | 106/38.25 X |
| 3,563,941 | 2/1971 | Plueddemann | 106/271 X |
| 3,645,767 | 2/1972 | Taylor | 106/38.27 X |
| 3,810,604 | 5/1974 | Reiter | 259/18 |
| 3,994,346 | 11/1976 | Brown | 106/38.27 X |
| 4,226,542 | 10/1980 | Black et al. | 366/17 |
| 4,235,552 | 11/1980 | Underwood | 366/137 |
| 4,329,063 | 5/1982 | Edwards | 366/34 |
| 4,478,514 | 10/1984 | Hudelmaier | 366/2 |
| 4,549,576 | 10/1985 | Angel | 285/158 X |

*Primary Examiner*—Harvey C. Hornsby
*Assistant Examiner*—Scott J. Haugland
*Attorney, Agent, or Firm*—Douglas G. Glantz

[57] ABSTRACT

The invention includes apparatus and method for inhibiting the hardening of a wetted concrete premix in a filled concrete mixer including providing a rotatable concrete mixer drum having a plurality of sealed apertures located throughout the entire length and circumference of the drum such that at least one of the apertures is located at or near the bottom of the drum at all points of rotation, and injecting a fluid under pressure through at least one aperture and into the drum when filled with a charge of wetted concrete premix to disperse the fluid throughout a portion of the charge adjacent to the aperture and up to the surface of the charge thereby inhibiting hardening.

20 Claims, 1 Drawing Sheet

EMERGENCY PROTECTION APPARATUS AND METHOD FOR CONCRETE MIXER TRUCKS DISABLED IN THE FIELD

BACKGROUND OF THE INVENTION

This invention relates to apparatus and method for inhibiting the hardening of concrete in a concrete mixer and, in one aspect, for protecting concrete mixer trucks from becoming bound up with a hardened charge of concrete, e.g., such as when such trucks become disabled in the field.

Concrete batch fabrication plants, commonly termed "ready-mix" plants, are widely in service today throughout the country for preparing concrete mixes consisting of water, cement, and aggregates of various sizes. Freshly batched concrete mixes are dispensed from such plants into concrete mixer trucks each having a revolving drum, and trucks filled with a charge of concrete mix transport the concrete to one or more job sites for pouring. After delivery of the concrete mix, the trucks return to the ready-mix plant for a new charge of concrete mix for delivery to the next job site. At the end of each day, the trucks are finally washed out to remove the accumulated deposits within the rotatable mixing drum.

As is pointed out in Black et al U.S. Pat. No. 4,226,542, the concrete mix remaining in a truck returning to the ready-mix plant for many years was simply dumped in the yard and allowed to harden. Eventually, the hardened concrete could be hauled away for use as landfill. However, the dumping of returned concrete at the ready-mix plant was found to be environmentally unsound, and attempts have been made to reclaim portions of the returned concrete mix to provide less environmentally damaging operations. U.S. Pat. No. 4,226,542 is one such attempt at reclaiming unused concrete mix returned to the ready-mix plant by removing aggregates from the concrete mix with a screw classifier. Returned concrete mix is dumped into an inlet hopper having a screw classifier for removing aggregate and coarse sand, and a weired channel enables gravity flow of the water, cement fines, and sand fines constituents into a slurry vessel.

Concrete construction operations today are performed almost entirely by delivering wetted premixed concrete for on-site pouring from ready-mix plants as described above. The wetted premixed concrete comprises wetted cement in the concrete mixer of delivery trucks, and this wetted cement will chemically bind with the water and thereby set up or harden in a certain amount of time. A significant problem develops when one of these delivery trucks filled with a charge of wetted concrete premium breaks down or otherwise is delayed in reaching a location where the wetted concrete can be dumped without adverse environmental impact. The problem arises when the concrete sets up or hardens in the rotatable drum of the delivery truck. The hardened concrete then must be removed with much difficulty from the rotatable drum by picks or jackhammers or the like. Oftentimes, it is impossible to remove the hardened concrete without destroying the integrity of the rotatable concrete mixer drum on the delivery truck.

It is an object of the present invention to provide apparatus and method for protecting the integrity of concrete mixers containing wetted concrete premix.

It is a further object of the present invention to provide a concrete mixer and method capable of inhibiting the hardening of a wetted concrete premium in those circumstances when the wetted concrete cannot be unloaded from the concrete mixer.

It is yet another object of the present invention to protect concrete mixer trucks from becoming bound up with a hardened concrete in an emergency circumstance when becoming disabled in the field.

These and other objects of the present invention will become apparent from the detailed description as follows.

SUMMARY OF THE INVENTION

The present invention includes apparatus including a rotatable concrete mixer drum, plugs spaced apart and located throughout the entire length and circumference of the drum, a channel bored in each of the plugs for providing a conduit to the interior of the drum, at least one hydraulic hose capable of transferring a fluid under pressure, connecting means on the plugs for attaching the hydraulic hose to the channel for hydraulic communication, and a pump for transporting the fluid under pressure through the hydraulic hose at a pressure sufficient for injecting the fluid through the channel and into a bottom location of the drum when the drum is filled with a charge of concrete mix, such that the pressure head of concrete mix is overcome and the fluid is dispersed throughout the charge to inhibit the hardening of the concrete mix. The apparatus further includes seals removably fixed in the channels. In one aspect, a distribution manifold is provided to deliver fluid from the pump to a plurality of hydraulic hoses. The invention further includes means for pumping the inhibiting fluid at a higher pressure sufficient to break through a partially set-up charge of concrete mix in the drum. The invention further still includes magnetically releasable, hydraulically driven vibrators to facilitate dispersion of fluid throughout the charge of concrete mix in the drum.

The invention includes a method for hydraulically inhibiting the hardening of a wetted concrete premix in a filled concrete mixer including providing a rotatable concrete mixer drum having a plurality of sealed apertures located throughout the entire length and circumference of the drum such that at least one of the apertures is located at or near the bottom of the drum at all points of rotation, and injecting a fluid under pressure through at least one aperture and into the drum when filled with a charge of wetted concrete premix to disperse the fluid throughout a portion of the charge adjacent to the aperture and up to the surface of the charge thereby inhibiting hardening.

DETAILED DESCRIPTION

Figure 1:
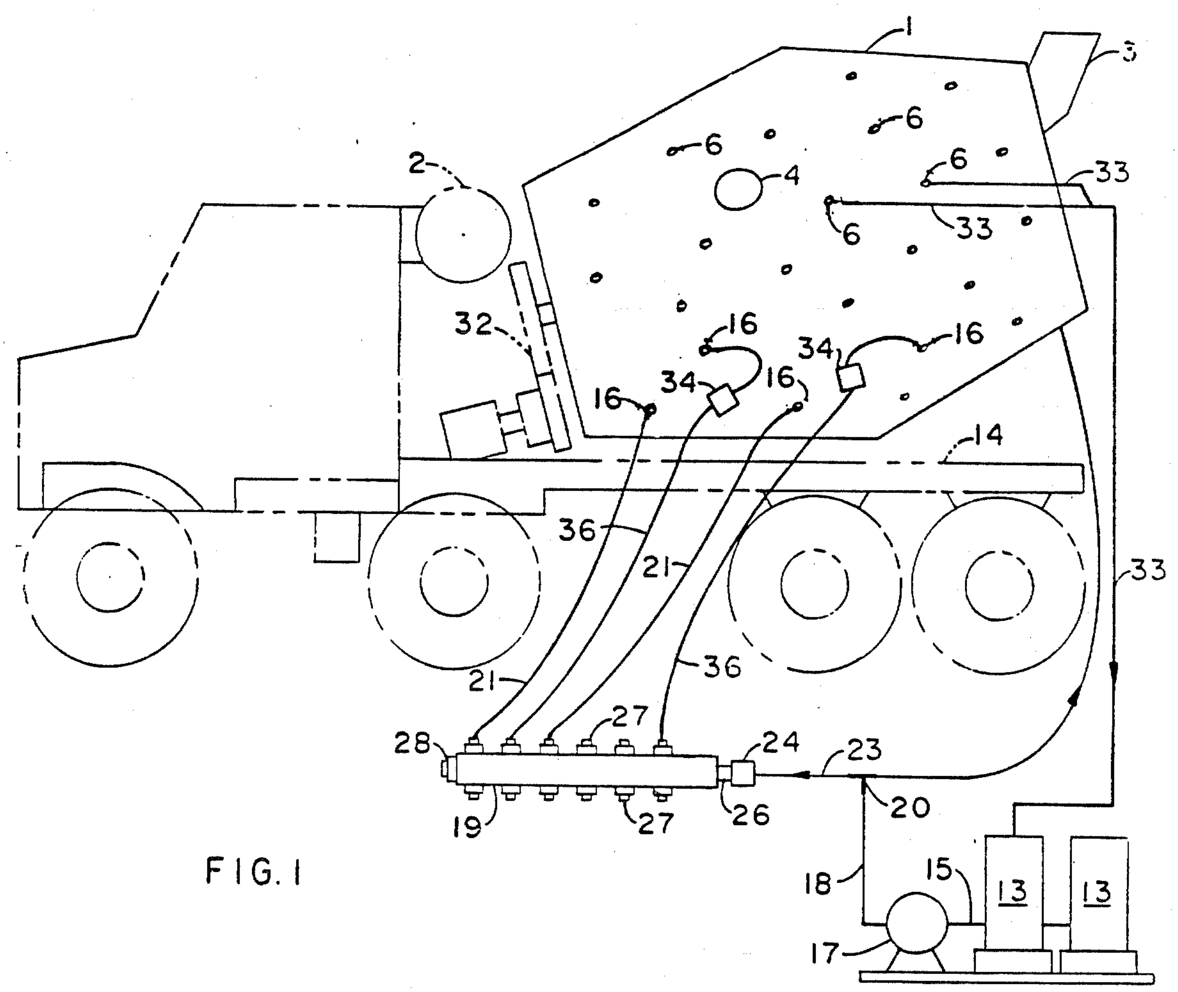
FIG. 1 is a schematic representation depicting an elevation side view of a concrete mixer truck incorporating the combination of elements of the present invention.

Referring now to FIG. 1, a concrete mixer truck suitable for the delivery of wetted concrete premix from a ready-mix concrete plant is depicted having rotatable drum 1 located on the trailer bed of the truck. Water tank 2 is held in position in the front portion of the trailer bed, and a filler receiver trough 3 is located at the top opening of drum 1. A port 4 is provided in the rotatable drum large enough for entrance and egress so that a person can work within rotatable drum 1.

In accordance with the present invention, plugs 6 are provided along the surface of rotatable drum 1. Plugs 6 are spaced apart and located throughout the entire length and circumference of the drum as shown in FIG. 1. Plugs 6 are established by providing apertures in the drum and welding plugs in the apertures.

Figure 2:
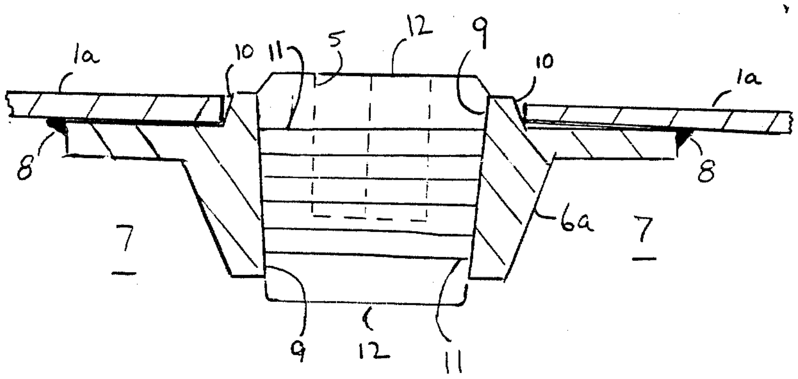
FIG. 2 shows a sealed plug according to the present invention welded to the sidewall of the rotatable drum in a concrete mixer truck.

Referring to FIG. 2, a plug 6a is depicted affixed to the inside surface of rotatable drum surface 1a. The interior or inside of rotatable drum 1a is shown by area 7. It can be seen that plug 6a fills the void set up by an aperture in drum wall surface 1a by locating plugs 6a in superimposed relationship to the aperture and welding at 8 to drum wall inside surface 1a. Plugs 6a include a tapered collar 10 for engaging drum wall surface 1a. Collar 10 includes a taper of about ¼ inch taper to engage drum wall surface 1a in a tight press fit.

The plugs as depicted in element 6a of FIG. 2 are an important aspect of the present invention since the sidewall surface of rotatable drum 1a in most ready-mix concrete delivery trucks today has an insufficient wall thickness for attaching, e.g., by threading, a pressurized device for the injection of a pressurized fluid into the concrete mix contained therein. The wall thickness in delivery trucks typically is on the order of about ¼ inch steel which is insufficient structurally to receive a threaded pressurized hose fitting. By way of example, connecting fittings could not be threaded into the side of a ¼ inch steel wall and provide the structural integrity necessary to withstand pressures utilized in the present invention. For this reason, plugs 6a in accordance with the present invention are provided and affixed to rotatable drum 1a such that a channel 9 can be bored in the plug to provide a conduit to the inside or interior 7 of rotatable drum 1a as shown in FIG. 2. Channel 9 has an inside thread 11 for engaging seal 12 which is removably fixed in the plug 6a. Plugs 6a are tapered inwardly toward the interior of drum 1a to minimize wear and fouling buildup of concrete mixing inside the rotating drum.

Referring now back to FIG. 1, reservoir holding tanks 13 are shown in position near the concrete mixer trailer bed 14. Holding tanks 13 contain a fluid capable of delivery into drum 1 under pressure. In accordance with the present invention, the fluid is injected under pressure into the inside surface of rotatable drum 1 at a plug located at or near the bottom of rotatable drum 1 as depicted by plugs 16. A critical aspect of the present invention involves locating the plugs spaced apart throughout the entire length and circumference of the drum so that a plug always will be available at or near the bottom of drum 1 at all points of rotation as indicated in FIG. 1 by plugs 16. This aspect of the present invention is critically important because in the event that an emergency occurs and the truck breaks down in the field, the rotatable drum oftentimes cannot be moved or rotated.

In such an emergency as when the ready-mix truck breaks down in the field, a fluid such as water is pumped from holding tank 13 through conduit 15 by pump 17. Water is pumped to pass through line 18 to manifold 19, which is described in more detail hereinbelow. A second manifold (not shown) receives pressurized water passing through splitter 20 for supplying the other side of drum 1. Pressure hoses 21 are connected to manifold 19 at one end, and the other end of pressure hose 21 is attached to the channel bored out of plug 16.

Water is then injected into the channel located in a plug 16 at a pressure sufficient to overcome the pressure head of concrete mix charged into rotatable drum 1 and to disperse the water throughout the charge of concrete mix in the drum thereby to inhibit hardening thereof. A pressure hose 21 is depicted in a configuration set up to transfer water from manifold 19 to plug 16. However, hose 21 would normally be positioned, i.e., when not in use, in the rack on a trailer or service truck (not shown) except in emergencies when the apparatus and method of the present invention are called upon to prevent hardening of the concrete mix in the drum.

Delivery manifold 19 is depicted having fluid inlet conduit 23 attached by pressure fitting 24 to the inlet nozzle 26 of manifold 19. Pressure ports 27 are provided in staggered arrangement in the side portions of manifold 19 and are capable of connection to pressure hoses. Typically, the pressure of water through connections 27 will be on the order of about 100–200 psig. A high pressure delivery port 28 is provided in the end portion of manifold 19 and is capable of a higher pressure water delivery than pressure ports 27. As an example, high pressure port 28 can deliver water at pressures above about 1,000 psig and is used typically in those cases where the charge of concrete mix in the drum has partially set up. In such cases, a high pressure will be necessary initially to break through the partially set-up charge at a pressure higher than the pressure head of unhardened concrete mix.

Delivery ports 27 and 28 are provided with manually operated cock valves (not shown). Alternatively, delivery ports 27 and 28 in manifold 19, in one aspect, have quick connect couplings (not shown). Such couplings are configured similar to that shown and described in U.S. Pat. No. 1,904,061. In this aspect, pressure hoses 21 have couplings which are interconnected with the delivery ports of manifold 19 for a quick action connection in emergency situations to prevent hardening of the concrete mix.

Plugs 6 as shown in FIG. 1 must be located in rotatable drum 1 to avoid mixing fins in drum 1 commonly found inside ready-mix concrete delivery trucks. The plugs are positioned in apertures in the drum wall and are spaced apart and located throughout the entire length and circumference of the drum but posterior to the drive sprocket 32 typically located in the front of drum 1. By way of example, plugs 6 have an overall outside dimension of about 4 inches in diameter (as viewed from inside drum 1) and a collar of about 2 inches as viewed from outside drum 1 and are spaced apart throughout the entire length and circumference of the rotatable drum at positions located at about 2 feet on center. Nevertheless, the plugs can be other dimensions, but preferably are sized in the range of about 4–6 inches outside diameter and have a collar 10 as depicted in FIG. 2 having a diameter of about one-half the dimension of the outside diameter, and more preferably about 4 inches outside diameter overall size. The preferred overall size of about 4 inches outside diameter and 2 inch collar permits an interior channel or conduit 9 as depicted in FIG. 2 of about 1 inch to 1¼ inch pipe size. In such structural dimensions, the plugs of the present invention provide sufficient strength for injecting the water into the charge of concrete mix at the desired pressures. The plugs preferably are made from a lightweight metal such as aluminum-magnesium alloy for the purpose of increasing the payload in the delivery truck. As an alternative, plugs made from cast steel work well and are more economical in the cost of materials and assembly to the rotatable drum wall. The plugs also can be made from engineering plastic materials.

Holding tanks 13 and the apparatus associated with the present invention can be positioned on a standby service truck or trailer. Such a service truck or trailer (not shown) provides the operational feature of placement at an on-site location to be held there for the duration of the concrete pouring project for an essentially indefinite period.

The pump depicted at 17 in FIG. 1 is a gasoline fueled pump or other pump capable of operation in the field. By way of example, a gasoline pump of about 10 horsepower is used for pumping the water in accordance with the present invention. However, an auxiliary pump is necessary in the case of an emergency wherein the charge of concrete mix has partially hardened. In such a case, an auxiliary pump (not shown), such as a hand-held hydraulic pump for providing high pressures, is connected to port 28 in manifold 19.

The seals 12 depicted in FIG. 2 preferably are made of a material of rubber or engineering plastic, for the reason that such material does not enter into a bonding relationship with concrete. A preferred seal is in the shape depicted in FIG. 2. The seals are tapered inwardly toward the inside of drum 1*a* so that the seals are tightly secured when engaged against the threads 11 but are capable of facilitated removal from plug 6*a*. A dome is shaped on the portion of seal 12 protruding into drum area 7. The dome prevents cracking caused by wear or fouling buildup of concrete mixing in the rotatable drum. A seal removal tool receptacle 5 is provided in seal 12 for receiving a seal removal tool such as a ratchet or spinner wrench (not shown). A lube grease should be applied to seal 12 before insertion into channel 9 of plug 6*a*.

The present invention provides means and method for hydraulically inhibiting the hardening of a wetted concrete premix in a filled concrete mixer. The invention involves providing a rotatable concrete mixer drum having a plurality of sealed apertures located throughout the entire length and circumference of the drum such that at least one of the apertures is located at or near the bottom of the drum at all points of rotation. When the concrete mixer breaks down, e.g., in an emergency in the field, a fluid such as water is injected under pressure through at least one of the apertures and into the drum when the drum is filled with a charge of wetted concrete premix to disperse the fluid throughout the portion of the charge adjacent to the aperture and up to the surface of the charge to inhibit hardening thereof. Water is injected in sufficient amounts to disperse within the charge of concrete mix and to prevent hardening.

Another aspect of the present invention involves withdrawing fluid from the top of rotatable drum 1 after injecting the fluid into the bottom. Fluid withdrawn from the top of the drum can be recirculated through a conduit or pipe 33 to holding tanks 13 as depicted in FIG. 1. Preferably, eight return pipes 33 are available to accommodate the withdrawn fluid. When recirculating fluid, the invention includes a filter (not shown) on line 15 between tanks 13 and pump 17 to remove particles carried over from drum 1.

Vibrators 34 are attached to drum 1 as shown in FIG. 1 to vibrate the charge of wetted concrete premix in drum 1 to facilitate dispersion of water injected through plugs 6 and throughout the charge. Vibrators 34 are magnetically attached to drum 1 and are manually releasable to provide a virtually instantaneous attachment to drum 1 and to provide a quick release and reattachment at another location on drum 1. The magnetically releasable vibrators thereby further provide enhanced dispersion of injected water throughout the charge by vibrating the drum at multiple locations. The vibrators also facilitate the inhibition of concrete hardening by separating the constituents in the concrete mix.

Vibrators 34 are hydraulically driven such that water pumped through pressure hoses 36 acts under pressure as the driving force for vibration action in the vibrators 34. Vibrators can be connected hydraulically in parallel as shown in FIG. 1 or in series (not shown) by connecting a first vibrator with pressure hose 36 and passing the pressurized fluid exiting the first vibrator to a second vibrator. In either parallel or series connection, the exiting fluid ultimately is passed to a plug 16 for injection into drum 1. Quick connect fluid couplings are used to facilitate coupling with the pressure hoses. Preferably, at least four magnetically releasable vibrators are used, two on each side of drum 1 located on the trailer bed of the truck, i.e., on each side of the drum-on-trailer-bed structure.

The apparatus and method of the present invention work particularly well when the interior surface of rotatable drum 1 as shown in FIG. 1 is coated prior to charging with the wetted concrete premix. It has been found that a preferred coating consists essentially of a dispersion of 10 wt. % silicon wax and about 1 wt. % molybdenum diluted in fuel oil. The coating is applied prior to filling wetted concrete premix into the concrete mixer drum, and a drum coated as such facilitates the mechanism employed in the present invention for inhibiting the hardening of the concrete mix along the inside surface of the drum.

While the invention has been described in terms of preferred embodiments, the claims appended hereto are intended to encompass all embodiments which fall within the spirit of the invention.

What is claimed is:

1. Apparatus including a concrete mixer having means for inhibiting the hardening therein of a charge of concrete mix comprising:

(a) a rotatable concrete mixer drum;

(b) plugs spaced apart and located throughout the entire length and circumference of said drum;

(c) a channel bored in each plug, said channel providing a conduit to the interior of said drum;

(d) at least one hydraulic hose capable of transferring a fluid under pressure;

(e) connecting means on said plugs for attaching said hydraulic hose to communicate hydraulically with said channel; and (f) a pump for transporting said fluid under pressure through said hydraulic hose at a pressure sufficient for injecting said fluid through said channel and into a bottom location of said drum when filled with a charge of concrete mix and further sufficient for hydraulically inhibiting the hardening of the charge of concrete mix.

2. The apparatus as set forth in claim 1 wherein said fluid comprises water.

3. The apparatus as set forth in claim 2 further comprising seals removably fixed in said channels.

4. The apparatus as set forth in claim 3 wherein said channel contains an inside thread adapted to hold said seals in said channel and said connecting means comprises a hose fitting adapted to engage said inside thread.

5. The apparatus as set forth in claim 4 wherein said seals are tapered inwardly toward the inside of the drum.

6. The apparatus as set forth in claim 3 further comprising at least one manifold for distributing water from said pump to a plurality of said hydraulic hoses.

7. The apparatus as set forth in claim 6 further comprising means for pumping water at a pressure sufficient to break through a partially set-up charge of concrete mix in said drum.

8. The apparatus as set forth in claim 7 wherein said manifold comprises a series of delivery ports having quick connect couplings for attaching pressure hoses capable of transferring said water at about 100–200 psig and one higher pressure coupling for attaching a pressure hose capable of transferring said water at pressures above about 1,000 psig.

9. The apparatus as set forth in claim 3 wherein said plugs have an outside diameter of about 4–6 inches, a collar of about 2–3 inches in diameter, and are welded to said drum at locations no more than about 2 feet on center.

10. The apparatus as set forth in claim 9 wherein said channel has an inside diameter of about 1 inch to 1¼ inch pipe size.

11. The apparatus as set forth in claim 10 wherein said seals are composed of rubber or engineering plastic.

12. The apparatus as set forth in claim 11 wherein said seals are tapered inwardly toward the inside of said drum and further wherein a dome is shaped on the portion of said seal protruding into said drum.

13. The apparatus as set forth in claim 12 further comprising means for withdrawing water from the top of said charge in said concrete mixer and means for recirculating withdrawn water to said pump.

14. A method for hydraulically inhibiting the hardening of a wetted concrete premix in a filled concrete mixer comprising:

(a) providing a rotatable concrete mixer drum having a plurality of sealed apertures located throughout the entire length and circumference of said drum, such that at all points of rotation of the drum, the apertures include a bottom aperture located below the surface of said premix; and (b) injecting a fluid under pressure through said bottom aperture and into said drum, when said drum is filled with a charge of wetted concrete premix, to disperse said fluid throughout a portion of said charge adjacent said aperture and up to the surface of said charge to inhibit hardening.

15. The method as set forth in claim 14 wherein said fluid comprises water.

16. A method as set forth in claim 15 further comprising vibrating said charge with a hydraulically driven, magnetically releasable vibrator to inhibit hardening by separating the constituents of the concrete mix.

17. A method as set forth in claim 16 wherein said drum is located on a truck trailer bed and said vibrating comprises establishing at least four vibrators on said drum, at least two on each side of the drum-on-trailer-bed structure.

18. A method as set forth in claim 15 further comprising withdrawing water from the top of said charge of concrete in said mixer and recirculating the withdrawn water.

19. A method as set forth in claim 18 further comprising coating the inside surface of said drum with a coating consisting essentially of about 10 wt% silicon wax and about 1 wt. % molybdenum diluted in fuel oil prior to filling said concrete mix into said concrete mixer to prevent hardening of concrete onto the inside surface of said drum.

20. A method of hydraulically inhibiting the hardening of concrete mix in a ready-mix concrete delivery truck disabled in the field comprising:

(a) positioning a plurality of plugs of about 4 inches overall outside diameter having an inside collar of about 2 inches in diameter in apertures in the sidewall of a rotatable concrete mixer drum on a ready-mix concrete delivery truck by welding said plugs into apertures formed in said sidewall at locations about 2 feet on center throughout the length and circumference of said drum;

(b) providing a channel of about 1 inch diameter bored in the center of said collar in said plugs to form a conduit for communicating hydraulically with the interior of said drum;

(c) sealing said channel with a removable seal composed of rubber or plastic;

(d) removing said seal from at least one plug located at or near the bottom of said drum when said truck becomes disabled in the field;

(e) connecting a pressure hose to said channel;

(f) pumping water through said pressure hose, through said channel, and into said drum filled with concrete mix at a pressure sufficient to overcome the pressure head of concrete mix and to disperse said water throughout the adjacent portion of concrete mix up to the surface of said mix to prevent hardening of the concrete mix;

(g) vibrating said concrete mix with a hydraulically driven, magnetically releasable vibrator to inhibit hardening by separating the constituents in the concrete mix; and (h) withdrawing water from a top portion of said concrete mix, recirculating withdrawn water to said pumping step, and filtering said withdrawn water to remove any particles carried over from said top portion.

* * * * *